(No Model.)

J. C. POLAND, Jr.
CENTRIFUGAL MACHINE.

No. 308,326. Patented Nov. 18, 1884.

WITNESSES:
C. S. Gooding.
A. L. White

INVENTOR:
J. C. Poland Jr.
by Wright Brown
Attys.

UNITED STATES PATENT OFFICE.

JOHN C. POLAND, JR., OF BOSTON, MASSACHUSETTS, ASSIGNOR TO JAMES G. CRAWFORD, OF SAME PLACE.

CENTRIFUGAL MACHINE.

SPECIFICATION forming part of Letters Patent No. 308,326, dated November 18, 1884.

Application filed February 7, 1884. (No model.)

*To all whom it may concern:*

Be it known that I, JOHN C. POLAND, Jr., of Boston, in the county of Suffolk and State of Massachusetts, have invented certain Improvements in Centrifugal Machines, of which the following is a specification.

This invention relates to that class of centrifugal machines in which the shaft supporting the perforated basket is supported at its lower end in a universally-pivoted step, and is provided with a supporting sleeve or bearing between the basket and step, and is intended particularly for centrifugal machines for use in laundries to separate water from fabrics.

The invention has for its object to provide improved means for imparting a yielding movement to the upper bearing of the shaft, and thus absorbing or taking up the vibrations of the shaft, caused by uneven loading of the basket, and preventing injury to the mechanism and the building in which it is contained.

To this end the invention consists in the combination, with the shaft and its upper bearing, of a spring or springs arranged at one side of said bearing and adapted to yield in any direction, a rigid support for said springs, and a connection between said springs and bearing, whereby the springs are enabled to support the bearing and permit it to yield as required by the vibrating movements of the shaft, all constructed as hereinafter set forth and claimed, as I will now proceed to describe.

Figure 1:
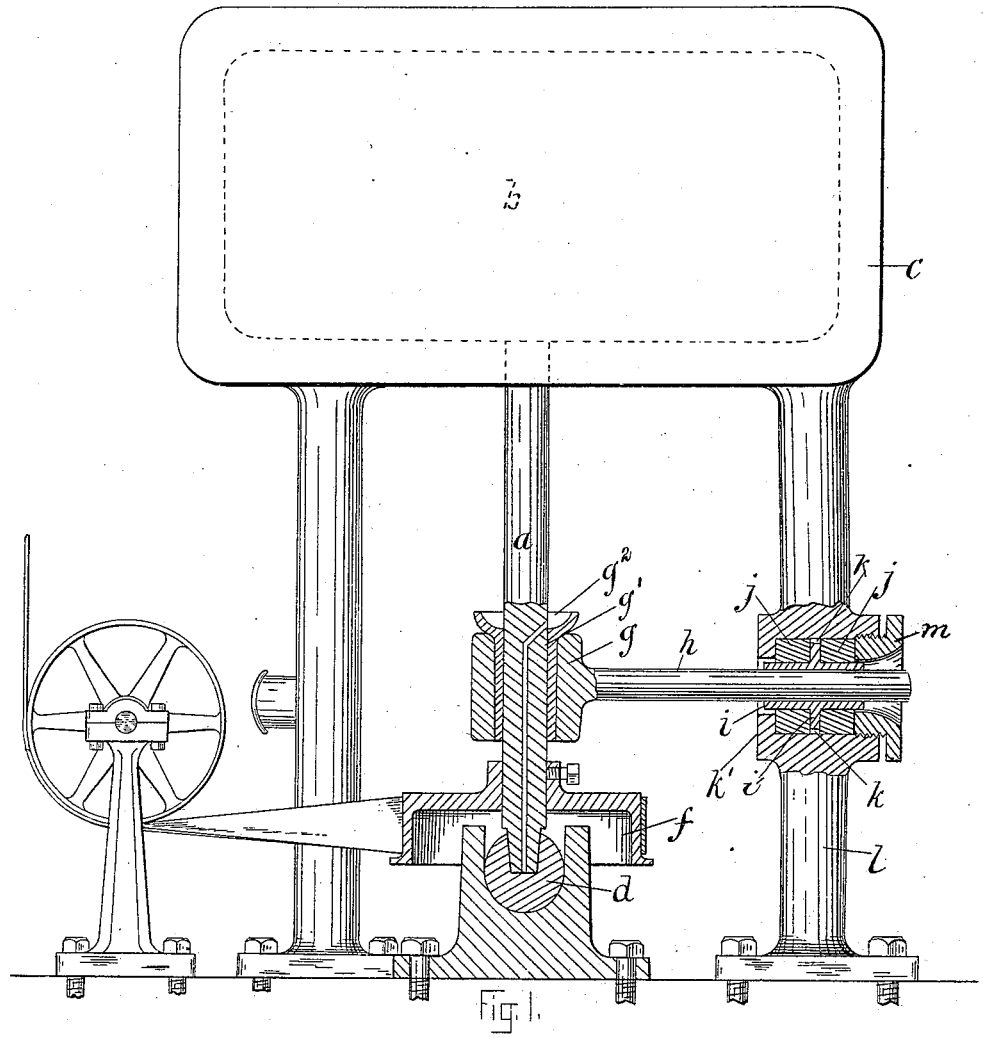
Figure 3:
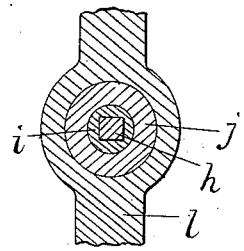
Figure 2:
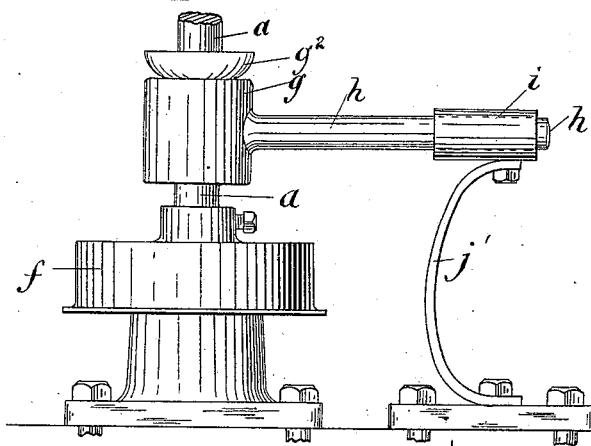

Of the accompanying drawings, forming a part of this specification, Figure 1 represents a vertical section and partial side elevation of a centrifugal machine embodying my invention. Figs. 2 and 3 represent modifications.

In the drawings, $a$ represents the vertical shaft, to the upper end of which the perforated basket $b$ is attached.

$c$ represents the casing, which is mounted on rigid supports. The lower end of the shaft $a$ rests in a step or bearing, $d$, which is universally pivoted, and is preferably a socketed ball resting in a corresponding seat, so as to permit the shaft to be inclined in any direction. The shaft is rotated by a driving-belt applied to a pulley, $f$, affixed to the shaft near its lower end. $g$ represents the upper bearing for the shaft. Said bearing is a metallic sleeve provided with a rigid bushing, $g'$, of brass or other suitable material, fitting the shaft closely, and having an oil-cup, $g^2$, whereby the bearing may be lubricated.

$h$ represents a straight metallic arm, formed on or rigidly attached to the bearing $g$ and extending substantially at right angles with the shaft $a$. Said arm has by preference a smoothly polished cylindrical surface.

$i$ represents a metallic sleeve or bearing through which the outer portion of the arm $h$ extends, said arm having no positive connection with the bearing $i$. A central external flange, $i'$, is formed on the bearing $i$. Said bearing is supported by springs $j j$, interposed between the bearing and walls of a cavity or chamber, $k$, in a rigid support, $l$. Said support is preferably one of the legs which support the casing $c$. The cavity $k$ has a flange, $k'$, at one end, which serves as an end bearing for one of the springs $j$. At the opposite end of said cavity is a gland, $m$, screwed into the cavity and supporting the outer end of the other spring. The flange $k'$ and gland $m$ are formed with central apertures larger than the bearing $i$, so that said bearing can move laterally, as required by the vibrations or oscillations of the shaft, as hereinafter described, without striking said flange or gland. When the shaft and basket are rapidly rotated, the vibrations of the shaft, caused by any inequality in the loading of the basket, will exert a lateral strain on the arm $h$, causing it to press laterally against the bearing $i$ in a direction which varies with the direction of the inclination of the shaft and cause the springs $j$ to yield correspondingly, the direction of the yielding movement changing gradually, so that the yielding point traverses entirely around the bearing during a single rotation of the shaft $a$. The described arrangement of the flange $k'$ and gland $m$ permits the bearing $i$ to move laterally in any direction, while the springs $j$ surrounding said arm, and located at a considerable distance from the shaft $a$, are enabled not only to yield in any direction to the movements of the shaft $a$ and arm $h$, but also to exert a considerable leverage on the arm, so that they will readily right the shaft and retain it normally in a vertical position. The springs $j$ are of rubber, and their location at a distance from the shaft $a$ prevents them from being injured by the oil used in lubricating said shaft. When rubber springs are arranged around the bearing in which the shaft rotates, the oil is liable to obtain access to them and cause them to rapidly deteriorate.

It is obvious that a single spring extending from the flange $k'$ to the gland $m$ may be employed instead of two springs shown, the flange $k'$ being omitted. I prefer the arrangement shown, however, because the two springs bearing on the flange prevent endwise displacement of the bearing $i$ independently of the springs.

The bearing of the lower end of the shaft $a$ may be lubricated by means of a channel extending from the oil-cup $g$ through the shaft to the step $d$, as shown.

I do not limit myself to the employment of rubber springs, nor to their arrangement around the bearing, as shown in Fig. 1.

The modification shown in Fig. 2 shows a metal spring, $j'$, secured at one end to the bearing $i$ and at its other end to a rigid support, the spring being adapted to normally hold the shaft $a$ in a vertical position and to yield in any direction to the movements of said shaft.

The arm $h$ may be square, or of other than a cylindrical form, if preferred, as shown in Fig. 3, in which case a movement of the shaft tending to slightly rotate the arm will exert a torsional strain on the spring, the latter, in its effort to return to its normal position, additionally assisting in righting the shaft $a$.

I am aware that it is not new to provide springs and similar devices for allowing the vertical shaft and upper bearing of a centrifugal machine to vibrate in all directions within certain limits, and that various specific devices for obtaining this result have been patented to G. L. Shorey, No. 228,129, November 6, 1883; P. Cramer, No. 144,319, November 4, 1873; W. Cairnes, No. 198,346, December 18, 1877; A. A. Goubert, No. 191,137, May 22, 1877; and to A. Fesca, No. 125,036, March 26, 1872; reissued January 2, 1877, No. 7,455. I do not claim any such invention, broadly, nor any of the specific devices shown and described in the above specifications; but What I do claim, and desire to secure by Letters Patent, is—

1. The combination, in a centrifugal machine, of the vertical shaft $a$, resting at its lower end in a universal bearing, the upper bearing for said shaft consisting of a metallic sleeve, $g$, provided with a rigid bushing, $g'$, a straight metallic arm, $h$, rigidly attached to said sleeve, a metallic sleeve, $i$, through which the arm $h$ extends, and springs supporting said sleeve in the frame of the machine, all constructed and arranged substantially as described.

2. The combination, in a centrifugal machine, of the vertical shaft $a$, resting in a universal bearing, the sleeve forming the upper bearing for said shaft having a rigid arm, a sleeve, $i$, forming a bearing for said arm, said sleeve having an external flange which fits an aperture in the frame or standard, the body of the sleeve being smaller than said aperture, and a spring or springs surrounding said sleeve, whereby the upper bearing and arm are permitted to have an oscillating movement, substantially as and for the purpose set forth.

3. The upper bearing, $g$, provided with a straight metallic arm, $h$, rigidly attached and extending substantially at right angles to it, in combination with a metallic sleeve, $i$, and springs $j\ j$, said sleeve being adapted to receive and support that end of the arm $h$ away from the shaft-bearing, and allowing the shaft to vibrate freely in all directions, as herein shown and described.

In testimony whereof I have signed my name to this specification, in the presence of two subscribing witnesses, this 5th day of February, 1884.

JOHN C. POLAND, JR.

Witnesses:
EDWARD F. POLAND,
C. F. BROWN.